(12) United States Patent
Calloway (10) Patent No.: US 10,976,163 B2
(45) Date of Patent: Apr. 13, 2021

(54) ROBUST VISION-INERTIAL PEDESTRIAN TRACKING WITH HEADING AUTO-ALIGNMENT

(71) Applicant: THALES DEFENSE & SECURITY INC., Clarksburg, MD (US)

(72) Inventor: Thomas Calloway, Dracut, MA (US)

(73) Assignee: THALES DEFENSE & SECURITY, INC., Clarksburg, MD (US)

( * ) Notice: Subject to any disclaimer, the term of this patent is extended or adjusted under 35 U.S.C. 154(b) by 501 days.

(21) Appl. No.: 15/765,688

(22) PCT Filed: Nov. 9, 2016

(86) PCT No.: PCT/US2016/061184
§ 371 (c)(1),
(2) Date: Apr. 3, 2018

(87) PCT Pub. No.: WO2017/083420
PCT Pub. Date: May 18, 2017

(65) Prior Publication Data
US 2018/0299271 A1    Oct. 18, 2018

Related U.S. Application Data

(60) Provisional application No. 62/253,637, filed on Nov. 10, 2015.

(51) Int. Cl.
*G01C 21/20* (2006.01)
*G01C 21/00* (2006.01)
(Continued)

(52) U.S. Cl.
CPC ........... *G01C 21/005* (2013.01); *G01C 21/20* (2013.01); *G01C 25/00* (2013.01); *G06F 3/005* (2013.01); *G06F 3/012* (2013.01)

(58) Field of Classification Search
CPC ...... G01C 21/20; G01C 21/005; G01C 25/00; G06F 3/012; G06F 3/005
See application file for complete search history.

(56) References Cited

U.S. PATENT DOCUMENTS 6,474,159 B1   11/2002   Foxlin et al.
6,594,617 B2   7/2003    Scherzinger
(Continued)

OTHER PUBLICATIONS

Aubeck, F., et al., "Camera Based Step Detection on Mobile Phones," International Conference on Indoor Positioning and Indoor Navigation, IPIN, pp. 1-4, Sep. 21-23, 2011.
(Continued)

*Primary Examiner* — Gregory J Toatley, Jr.
*Assistant Examiner* — Lynda Dinh
(74) *Attorney, Agent, or Firm* — Arent Fox LLP (57) ABSTRACT

A method, a system, and a computer-readable medium for tracking position and orientation of a pedestrian. The system tracks a head position or head orientation of the pedestrian, and a foot position or foot orientation of the pedestrian. The system determines a first heading or position uncertainty associated with the head position or the head orientation of the pedestrian, and determines a second heading or position uncertainty associated with the foot position or the foot orientation of the pedestrian. Moreover, the system determines which of the first heading or position uncertainty or the second heading or position uncertainty is smaller. The system transfers the first heading or position uncertainty to a device or system portion for foot position, or transfers the second heading or position uncertainty to a device or system portion for head position.

22 Claims, 8 Drawing Sheets

(51) Int. Cl.
*G01C 25/00* (2006.01)
*G06F 3/00* (2006.01)
*G06F 3/01* (2006.01)

(56) References Cited

U.S. PATENT DOCUMENTS

| | | | | |
|---|---|---|---|---|
| 9,063,330 | B2* | 6/2015 | LaValle | G06T 5/002 |
| 9,324,229 | B2* | 4/2016 | Baillot | G06F 3/012 |
| 2012/0188279 | A1* | 7/2012 | Demaine | G06F 3/013 |
| | | | | 345/633 |
| 2015/0234475 | A1 | 8/2015 | Latta et al. | |
| 2016/0246061 | A1* | 8/2016 | Bickerstaff | H04N 5/23258 |

OTHER PUBLICATIONS

Foxlin, E., "Pedestrian Tracking with Shoe-Mounted Inertial Sensors," Computer Graphics and Applications, IEEE 25.6, pp. 38-46, 2005.

Foxlin, E., et al., "Improved Registration for Vehicular AR using Auto-Harmonization," IEEE International Symposium on Mixed and Augmented Reality, Science and Technology Proceedings, pp. 105-112, Sep. 10-12, 2014.

Hesch, J., et al.,"Camera-IMU-based localization: Observability analysis and consistency improvement," The International Journal of Robotics Research, vol.#33, No. 1, p. 182-201, 2013.

International Search Report and Written Opinion issued in PCT Application No. PCT/US2016/061184 dated Jan. 31, 2017.

Zheng, Y., et al., "Tour the World: Building a Web Scale Landmark Recognition Engine," NUS Graduate Sch. for Integrative Sciences and Engineering, National University of Singapore. pp. 1-8, 2009.

Extended European Search report issued in Patent Application No. 16864935.8. dated Jun. 12, 2019.

Lauro Ojeda et al., Transfer Alignment from a Personal Locator to a Handheld or Head-mounted Instrument, Head-and Helmet-Mounted Displays XVI; Design and Applications, Proc. of SPIE. vol. 8041, No. 1-3, May 31, 2011.

Muhammad Iiyas et al., Pose Estimation of Head-Mounted Imaging Device by Transfer Alignment Technique in Unstructured Indoor Environment, 2013 13th International Conference on Control Automationa and Systems (ICCAS), pp. 213-218, Oct. 13, 2015.

* cited by examiner

ROBUST VISION-INERTIAL PEDESTRIAN TRACKING WITH HEADING AUTO-ALIGNMENT

CROSS-REFERENCE TO RELATED APPLICATION(S)

This application is a National Phase Application of PCT/US2016/061184, filed on Nov. 9, 2016, which claims the benefit of U.S. Provisional Application Ser. No. 62/253637, entitled "ROBUST VISION-INERTIAL PEDESTRIAN TRACKING WTH HEADING AUTO-ALIGMENT" and filed on Nov. 10, 2015, each of which is expressly incorporated by reference herein in its entirety.

BACKGROUND

Field

The present disclosure relates generally to motion tracking, and more particularly, to a method, system, and computer program product for motion tracking in connection with augmented reality systems, e.g., including a head mounted tracking device and a foot mounted tracking device.

Background

Recently there has been an explosion of interest in augmented reality (AR) well beyond the research community where the field was forged in the early years of the International Symposium on Mixed and Augmented Reality (ISMAR) conference and its prequels. The popular press has adopted the vision of the pioneering researchers, in which AR will become an indispensable tool to augment human performance by providing enhanced situational awareness and visual guidance to complete tasks quickly and accurately without advance training.

For the past several years it seemed that the early focus on head mounted display (HMD)-based AR had largely given way to tablet and telephone AR because the devices became widely available to consumers, and advertisers saw the novelty of simple video AR as a way to reach them. Wearable AR systems leave the user's hands free and are able to provide an always-on information display that is ready to provide augmentations quickly when they are needed.

This renewed interest in HMDs still faces challenges, including the need for optical technologies to produce small comfortable HMDs with sufficient field of view (FOV), and head-tracking that can produce convincing spatio-temporal registration of augmentations to their corresponding physical objects in unprepared real-world environments. Additional details may be found in Joel A. Hesch, et al. "Camera-IMU-based localization: Observability analysis and consistency improvement." *The International Journal of Robotics Research,* 2013, 02783114913509675; Ferenc Aubeck, Carsten Isert, and Dominik Gusenbaur. "Camera based step detection on mobile phones". *Indoor Positioning and Indoor Navigation (IPIN), 206 International Conference on. IEEE,* 206; Eric Foxlin. "Pedestrian tracking with shoe-mounted inertial sensors." *Computer Graphics and Applications,* IEEE 25.6 (2005): pp. 38-46.; Eric Foxlin, Thomas Calloway, and Hongsheng Zhang. "Improved registration for vehicular AR using auto-harmonization." *Mixed and Augmented Reality (ISMAR),* 2015 IEEE International Symposium on. IEEE, 2014; and Yan-Tao Zheng, et al. "Tour the world: building a web-scale landmark recognition engine." *Computer Vision and Pattern Recognition. CVPR 2009. IEEE Conference on.* IEEE, 2009, the entire contents of each of which are incorporated herein by reference.

The ability to operate without markers has been demonstrated in many indoor and outdoor environments at impressive scale, and for video-see-through AR (such as tablets and telephones) vision-based techniques also produce rock-solid registration with no noticeable swim or mis-registration. However optical see-through registration is a much harder problem because the view of the physical world cannot be delayed to match the view of virtual augmentations, and the alignment is not able to be simply matched up in a video image, which puts a much greater demand on absolute 6-DOF pose accuracy and relative calibration accuracy of the tracker to the display.

Thus, there remains an unmet need for high rate, low latency head tracking for AR systems that works robustly in both indoor and outdoor environments without the need for installing any external equipment or markers in the environment. In addition, there is an unmet need for AR systems that are able to function in the absence of global positioning system (GPS) data with intermittent visual features and in the presence of magnetic interference.

SUMMARY

In light of the above described problems and unmet needs, aspects of the design, development and testing of an augmented reality (AR) system are presented herein. These aspects may be used, e.g., for aerospace and ground vehicles in order to meet stringent accuracy and robustness requirements. A system is presented that is able to acquire and maintain yaw alignment in the real world: outdoor environment, indoor environment, in an urban environment, in buildings, in caves, etc. Additional aspects include system architecture, motion-tracking algorithms, and harmonization techniques for implementing a precision AR system for someone on the ground (e.g., a pedestrian).

In an aspect of the disclosure, a method, a computer-readable medium, and a system for tracking a position and orientation of a pedestrian are provided. The method, medium, and system may track, using a head mounted tracking device, for example, at least one of a head position or a head orientation of the pedestrian. The method, medium, and system may also track, using a foot mounted tracking device, at least one of a foot position or a foot orientation of the pedestrian. Further, the method, medium, and system may determine a first heading and/or position uncertainty associated with the at least one of the head position or the head orientation of the pedestrian. The method, medium, and system may determine a second heading and/or position uncertainty associated with the at least one of the foot position or the foot orientation of the pedestrian. Furthermore, the method, medium, and system may also determine which of the first heading or position uncertainty or the second heading and/or position uncertainty is smaller. Moreover, the method, medium, and system may transfer the first heading and/or position uncertainty to the foot mounted tracking device when it is determined that the first heading and/or position uncertainty is smaller, or transfer the second heading and/or position uncertainty to the head mounted tracking device when it is determined that the second heading and/or position uncertainty is smaller.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

Various example aspects of the systems, methods, and computer-readable media will be described in detail, with reference to the following figures, wherein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of vision-inertial pedestrian tracking features will now be presented with reference to various systems, apparatuses, and methods. These systems, apparatuses, and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall implementation.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to include instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof If implemented in software, the functions may be stored on or encoded as one or more instructions or code on a computer-readable medium or media. Computer-readable media includes computer storage media. Storage media may be any available media that is able to be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that may be used to carry or store desired program code in the form of instructions or data structures and that may be accessed by a computer. Disk and disc, as used herein, includes CD, laser disc, optical disc, digital versatile disc (DVD), and floppy disk, where disks usually reproduce data magnetically, while discs reproduce data optically with lasers. Combinations of the above should also be included within the scope of computer-readable media.

This application contains various features that relate to U.S. Pat. No.

6,474,159, titled "Motion Tracking," which issued on Nov. 5, 2002, the entire contents of which are incorporated herein by reference.

Aspects of the system and method presented herein may be compatible with various mission computers that may be used in ground military training and/or missions, for example. In order to be compatible with, e.g., different mission computers (MC) that may already be present in an HMD, an HMD in accordance with aspects of the present disclosure may implement the head-tracking, rendering and/or display functions that are common to all ground AR systems, and none of the mission-specific functions, such as targeting, cueing, enhanced vision, and/or synthetic vision. As such a system may be responsible for rendering, but may not decide what is to be rendered, the interface to the MC may allow the MC to define and download an arbitrary set of "symbols," including any 2D or 3D shapes involving line segments of any color or thickness and/or bitmaps. Each symbol may be specified by the MC to be ground-stabilized or head-stabilized.

Figure 1:
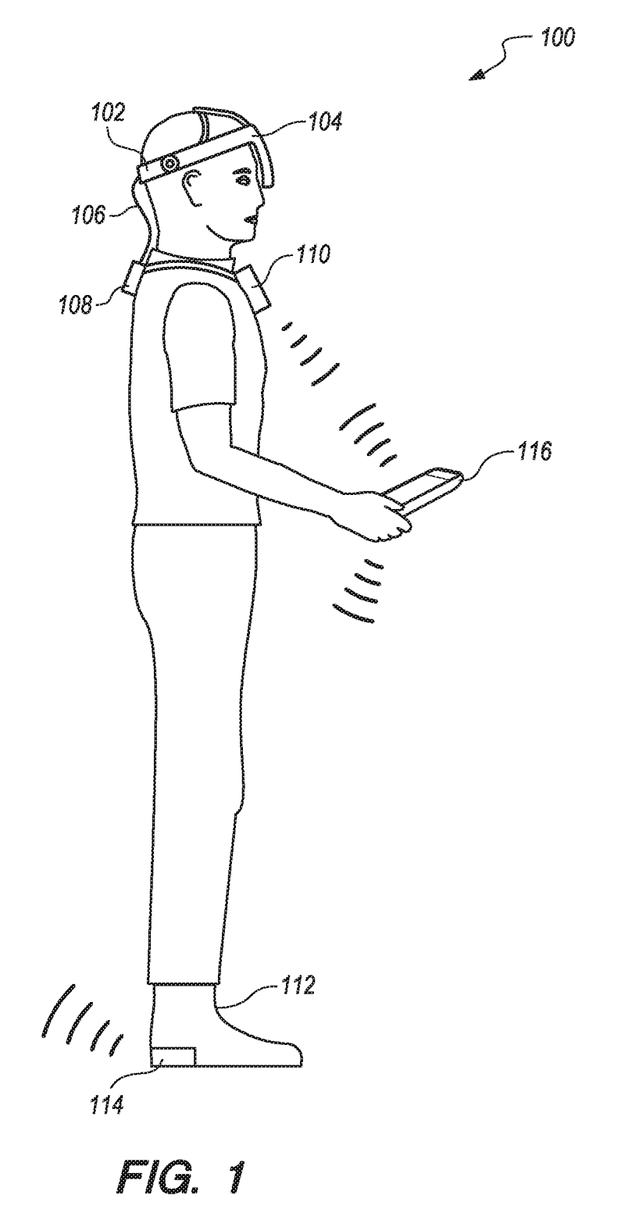
FIG. 1 is a diagram illustrating an example of a vision-inertial pedestrian tracking system in accordance with aspects of the present disclosure.

FIG. 1 is an overall system diagram of an example tracking system 100 (e.g., an AR vision-inertial pedestrian tracking system) for use in accordance with aspects of the present disclosure. The example system of FIG. 1 includes, for example, a HMD 102 with a head mounted camera (illustrated in FIG. 2) and a display 104. A control unit 110 and image generator (illustrated in FIG. 2) may be coupled to one another via an interface box 108 and one or more cables and/or wires 106. The control unit 110 and image generator may receive tracking data (e.g., from the camera) relating at least one of a head position or a head orientation of the pedestrian. The image generator may generate an image that is displayed on display 104. In an aspect, the camera may include a natural feature tracker (e.g., hybrid optical-based inertial tracker) running a contemporaneous localization and mapping (SLAM) algorithm, such as ORB-SLAM (ORB indicates "Oriented FAST and Rotated BRIEF" features), while searching for known landmarks to provide absolute map registration at the controller.

The tracking system 100 may also include a foot mounted tracking device 114 positioned, for example, in a shoe 112 of the pedestrian. The foot mounted tracking device 114 may include a foot mounted inertial measurement unit that tracks the foot position and/or the foot orientation in GPS denied environments to within, e.g., a certain percentage of total distance travelled. For example, the foot mounted tracking device 114 may track the foot position and/or orientation to within 1% of the total distance traveled, which is 1m of error after walking/running 100 m.

In addition, the tracking system 100 may include a communication device 116, such as a smart telephone that is in communication with the HMD 102 and the foot mounted tracking device 114. Moreover, the HMD 102 and the foot mounted tracking device 114 may be in direct communication with each other.

A Kalman Filtering (KF) component and/or global pose adjustment component may be used by at least one of the controller 110 of the HMD 102 and/or the foot mounted tracking device 114 in accordance with aspects presented herein. For example, the KF component of the controller 110 may be used to perform visual-inertial odometry (VIO) and/or determine foot pose (e.g., using a zero-velocity updating (ZUPT) algorithm). The global pose adjustment component may be used to align information related to VIO, the foot position, and/or recognized landmarks.

In addition, the tracking system 100 may use a rolling-shutter image sensor in the HMD 102, and thus may have to process each individual fiducial measurement acquired by the HMD 102 separately at a different point in time, using a nonlinear bearings measurement model, which operates as a function of position as well as orientation. By using a global shutter imager and the much faster processing element in the controller 110 (e.g., Acorn Reduced Instruction Set Computing Machine (ARM) Cortex A8 at 1 GHz), the HMD 102 and/or the foot mounted tracking device 114 presented herein may be able to contemporaneously capture and decode up to or more than 20 ORB features at frame rate. For every frame captured by the camera, the controller 110 may solve for pose using a modified version of the OpenCV pose recovery algorithm, which results in a measurement of the head position, the head orientation, the foot position, and/or the foot orientation that may be used to correct drift. Therefore, the head orientation may be tracked independently from position using camera pose measurements and a very simple 6-state Complementary Kalman Filter (CKF) to estimate the position/orientation errors and biases.

Still referring to FIG. 1, the control unit 110 may determine a first heading and/or position uncertainty associated with at least one of the head position or the head orientation of the pedestrian based on the at least one of the head position or the head orientation. For example, the control unit 110 may track the at least one of the head position or the head orientation of the pedestrian by attempting to recognize one or more visual landmarks captured by the camera and may determine the first heading and/or position uncertainty based on the tracking. In an additional aspect, the control unit 110 may provide map registration based on the one or more visual landmarks being recognized. Moreover, the control unit 110 may determine a first heading and/or position uncertainty associated with the at least one of the head position or the head orientation of the pedestrian. For example, the first heading and/or position uncertainty determined by the control unit 100 may be related to one or more of first yaw information associated with at least one of the head position or the head orientation, first roll information related to the associated with at least one of the head position or the head orientation, first pitch information associated with at least one of the head position or the head orientation, first up and/or down information associated with at least one of the head position or the head orientation, first forward and/or back information associated with at least one of the head position or the head orientation, and/or first left and/or right information associated with at least one of the head position or the head orientation.

Referring still to FIG. 1, the foot mounted tracking device 114 may track at least one of a foot position or a foot orientation of the pedestrian. For example, the at least one of the foot position or the foot orientation of the pedestrian may be tracked in a GPS denied environment. In an aspect, the foot mounted tracking device 114 may determine a second heading and/or position uncertainty associated with the at least one of the foot position or the foot orientation of the pedestrian based on the tracking. For example, the second heading and/or position uncertainty determined by the foot mounted tracking device 114 may be related to second yaw information associated with at least one of the foot position or the foot orientation, second roll information associated with at least one of the foot position or the foot orientation, second pitch information associated with at least one of the foot position or the foot orientation, second up and/or down information associated with at least one of the foot position or the foot orientation, second forward and/or back information associated with at least one of the foot position or the foot orientation, and/or second left and/or right information associated with at least one of the foot position or the foot orientation.

Referring again to FIG. 1, the tracking system 100 may determine which of the first heading and/or position uncertainty or the second heading and/or position uncertainty is smaller. For example, GPS may only be able to provide information related to absolute position, visual landmarks captured by the camera may be able to provide information related to absolute heading and/or position, the Visual-Inertial Odometry Component of the Kalman Filter may provide information related to heading and/or position which may accumulate error over time, the foot mounted tracking device 114 may provide information related to relative heading and/or position information and accumulate error over time. The tracking system 100 may be able to determine information related to absolute position and/or orientation by combining one or more of the information and/or accumulated error from one or more of the GPS, the VIO component of the Kalman Filter, and/or the camera, the foot mounted sensor component 114.

In a first example embodiment, the control unit 110 and the foot mounted tracking device 114 may transmit information associated with respective heading and/or position uncertainties to a communication device 116, such as a smart telephone carried by the pedestrian. In an aspect, the control unit 110 may transmit information related to the first heading and/or position uncertainty to the communication device 116 using one or more of global navigation satellite system (GNSS) signaling, Bluetooth® short-range wireless communication signaling, Wi-Fi communication signaling, long term evolution (LTE) wireless communication signaling, and/or radio-frequency identification (RFID) communication signaling, among other modes of communication. Similarly, the foot mounted tracking device 114 may transmit information related to the second heading and/or position information to the communication device 116 using one or more of GNSS signaling, Bluetooth® short-range wireless communication signaling, Wi-Fi communication signaling, LTE wireless communication signaling, and/or RFID communication signaling, among others. The communication device 116 may determine which of the first heading and/or position uncertainty or the second heading and/or position uncertainty is smaller. If the first heading and/or position uncertainty is determined to be smaller than the second heading and/or position uncertainty, the communication device 116 may transmit the information related to the first heading and/or position uncertainty to the foot mounted tracking device 114. Alternatively, when the first heading and/or position uncertainty is smaller than the second heading uncertainty, the communication device 116 may transmit signaling to the control unit 110 that indicates that information related to the first heading and/or position uncertainty should be sent from the control unit 110 to the foot mounted tracking device 114. In either case, the foot mounted tracking device 114 may use the first heading and/or position uncertainty to correct the at least one of the foot position or the foot orientation of the pedestrian rather than by using the second heading and/or position uncertainty.

Moreover, if the second heading and/or position uncertainty is determined to be smaller, the communication device 116 may transmit information related to the second heading and/or position uncertainty to the control unit 110. Alternatively, when the second heading and/or position uncertainty is smaller than the first heading and/or position uncertainty, the communication device 116 may send signaling to the foot mounted tracking device 114 that indicates that information related to the second heading and/or position uncertainty should be sent from the foot mounted tracking device 114 to the control unit 110. In either case, the control unit 110 may use the second heading and/or position uncertainty to correct the at least one of the head position or the head orientation, rather than by using the first heading and/or position uncertainty.

In a second example embodiment, the control unit 110 and the foot mounted tracking device 114 may transmit the information associated with their respective heading and/or position uncertainties to each other without the need for communicating with the communication device 116. For example, a transfer and/or exchange of information associated with heading and/or position uncertainty between the HMD 102 and the foot mounted tracking device 114 may occur automatically when the HMD 102 recognizes at least a portion of the shoe 112. In an aspect, the control unit 110 of the HMB 102 may transmit (e.g., automatically) information related to the first heading and/or position uncertainty to the foot mounted tracking device 114 using one or more of GNSS signaling, Bluetooth® short-range wireless communication signaling, Wi-Fi communication signaling, LTE wireless communication signaling, and/or RFID communication signaling, among others. Similarly, the foot mounted tracking device 114 may transmit (e.g., automatically) information related to the second heading and/or position information to the control unit 110 of the HMD 102 using one or more of GNSS signaling, Bluetooth® short-range wireless communication signaling, Wi-Fi communication signaling, LTE wireless communication signaling, and/or RFID communication signaling, among others. A determination with respect to which of the first heading and/or position uncertainty or the second heading and/or position uncertainty is smaller may be made by one or more of the control unit 110 and/or the foot mounted tracking device 114. When it is determined that the first heading and/or position uncertainty is smaller than the second heading and/or position uncertainty, the foot mounted tracking device 114 may use the first heading and/or position uncertainty to correct the at least one of the foot position or the foot orientation of the pedestrian. Alternatively, when it is determined that the second heading and/or position uncertainty is smaller than the first heading and/or position uncertainty, the control unit 110 may use the second heading and/or position uncertainty to correct the at least one of the head position or the head orientation.

In this way, the system of the present disclosure is able to provide a high rate, low latency head tracking that works robustly in both indoor and outdoor environments without the need for installing any external equipment or markers in the environment. In addition, the system of the present disclosure is able to provide position and orientation track of a pedestrian in the absence of GPS data, with intermittent visual features and in the presence of magnetic interference.

Figure 2:
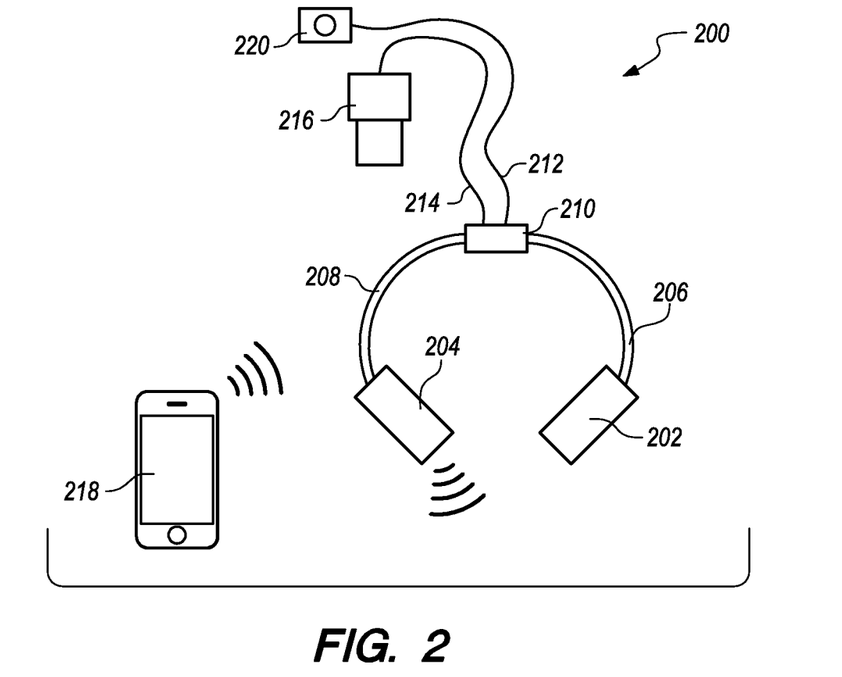
FIG. 2 is a diagram illustrating an example of an HMD system in accordance with aspects of the present disclosure.

FIG. 2 illustrates a system diagram of various features of an example HMD system 200 for use in accordance with aspects of the present disclosure. For example, the HMD system may be the HDM 102 illustrated in FIG. 1.

In one aspect, the HDM system 200 illustrated in FIG. 2 may include a camera 220 (e.g., natural feature tracking device, a global shutter camera, and/or rolling shutter camera) that operates a mapping (e.g., a contemporaneous localization and mapping (SLAM)) algorithm, such as an ORB-SLAM (e.g., ORB indicates "Oriented FAST and Rotated BRIEF" features) while searching for known landmarks to provide absolute map registration. In one aspect, the camera 220 may obtain monochrome images from an image sensor such as digital night vision goggles (NVGs). Additionally or alternatively, the camera 220 may include a zoom with a range of 1200 mm or more. The camera 220 may be coupled to a control unit 204 and a battery unit 202 via an interface box 210. For example, the camera 220 may be connected to the interface box via cable 212. Signals associated with images captured by the camera 220 (e.g., 30 Hz images) may be transmitted to the interface box 210 that then sends the signals to the controller 204 via, for example, cable and/or wire 208 for processing. For example, controller 204 may process, filter, and/or alter signals received from the camera 220 and overlay a visual landmark (e.g., building, vehicle, hill, tree) with a symbol and/or fiducial that is projected by an image generator 216 onto a visor, goggle, and/or lens (not illustrated in FIG. 2) through which the pedestrian is looking. For example, the image generator 216 may be connected to the interface box via cable and/or wire 214. Additionally, the controller 204 may determine a first heading and/or position uncertainty associated with a head position and/or head orientation of the pedestrian, and correct the first heading and/or position uncertainty with information related to a second heading and/or position uncertainty related to a foot position and/or foot orientation, similar to as described with respect to FIG. 1. The information related to the second heading and/or position uncertainty may be received, for example, from the communication device 218 and/or foot mounted tracking devices 304a, 304b illustrated in FIG. 3.

At times the sun may be directly in the field of vision (FOV) of the camera 220, which may create dynamic range problems. In order to address the potential challenges caused by sunlight, the exposure may be lowered when the sunlight is too bright, and increased when it is too dark.

Still referring to FIG. 2, the controller 204 may include a system on module (SOM), such as an embedded computer built on a single circuit board. The SOM may include a microprocessor with RAM, input/output controllers and all other features needed for signal processing. In addition, the controller 204 may include a Bluetooth® wireless transmitter/receiver, a Wi-Fi transmitter/receiver, an LTE transmitter/receiver, and/or an RFID transmitter/receiver for communication with external devices, such as a smart phone or other communication device 218 and/or the foot mounted tracking devices 304a, 304b illustrated in FIG. 3. In an aspect, the controller 220 may transfer information associated with the first heading and/or position uncertainty to the communication device 218 and/or foot mounted tracking devices 304a, 304b illustrated in FIG. 3. Moreover, the controller 220 may receive information related to the second heading and/or position uncertainty related to a foot position and/or foot orientation from the communication device 218 and/or foot mounted tracking devices 304a, 304b. Additionally, the controller 204 may include controls and/or buttons that may used to adjust the features of the HMD system 200. For example, the controls and/or buttons may enable an on/off function of the HMD system 200 and/or change the settings used by the camera and/or the image generator 216.

In an example embodiment, the image generator 216 may receive signals from the controller 204 related to images with or without fiducial markings related to the images captured by the camera 220. The signals may include correction based on the second heading and/or position uncertainty when appropriate. The image generator 216 may be coupled to the interface box 210 via, for example, cable and/or wire 214 (e.g., low voltage differential signaling (LVDS) cable and/or a high definition multimedia interface (HDMI) cable). The image generator 216 is able to then project an image based on the signal received from the controller 204 onto a visor, goggle, or lens (not illustrated in FIG. 2).

A battery 202 (e.g., a Lithium (Li)-ion battery) may also be coupled to the interface box 210 via, for example, cable and/or wire 206, and used to power one or more of the controller 204, the camera 220, and/or the image generator 216.

Figure 3:
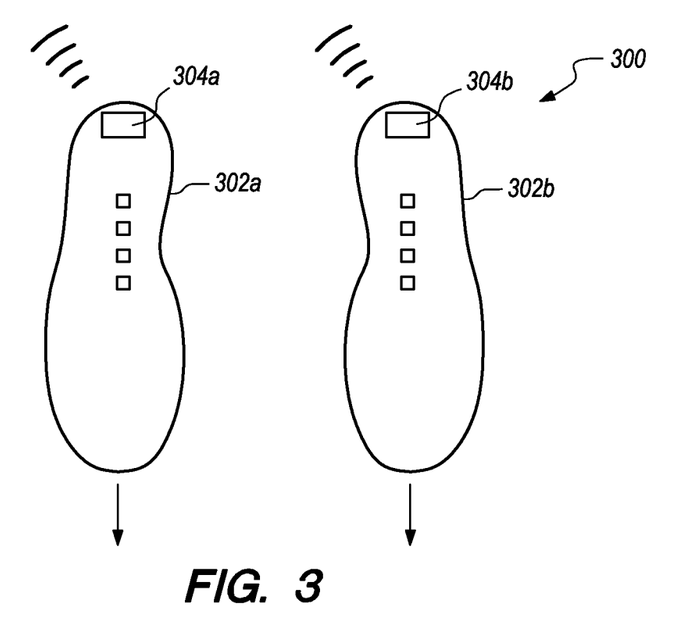
FIG. 3 is a diagram illustrating an example of a foot tracking system in accordance with aspects of the present disclosure.

FIG. 3 illustrates a system diagram of an example foot tracking system 300 for use in accordance with aspects of the present disclosure. For example, the foot tracking system 300 may include the shoe 112 with the foot mounted tracking device 114 illustrated in FIG. 1.

In one aspect, the foot tracking system 300 illustrated in FIG. 3 may include a pair of shoes 302a, 302b each including a foot mounted tracking device 304a, 304b embedded therein. The foot mounted tracking devices 304a, 304b may include a controller (not depicted) that is able to perform zero velocity Kalman Filter updates and learn the foot shape as a fiducial. Over time, when there are few or no visual landmarks, the HMD system 200 will drift in heading and/or position more rapidly. The foot tracking system 300 may then become the system with the least amount of heading and/or position uncertainty, and the controller of the foot mounted tracking device 304a, 304b is able to send information related to the second heading and/or position uncertainty to one or more of the communication device 218 and/or the controller 204 of the HMD system 200 illustrated in FIG. 2. The HMD system 200 may use the second heading and/or position uncertainty to correct the head position and/or the head orientation. Similarly, the foot tracking system 300 is able to receive information related to the first heading and/or position uncertainty from the HMD system 200 and use this information to correct for the foot position and/or foot orientation.

Figure 4A:
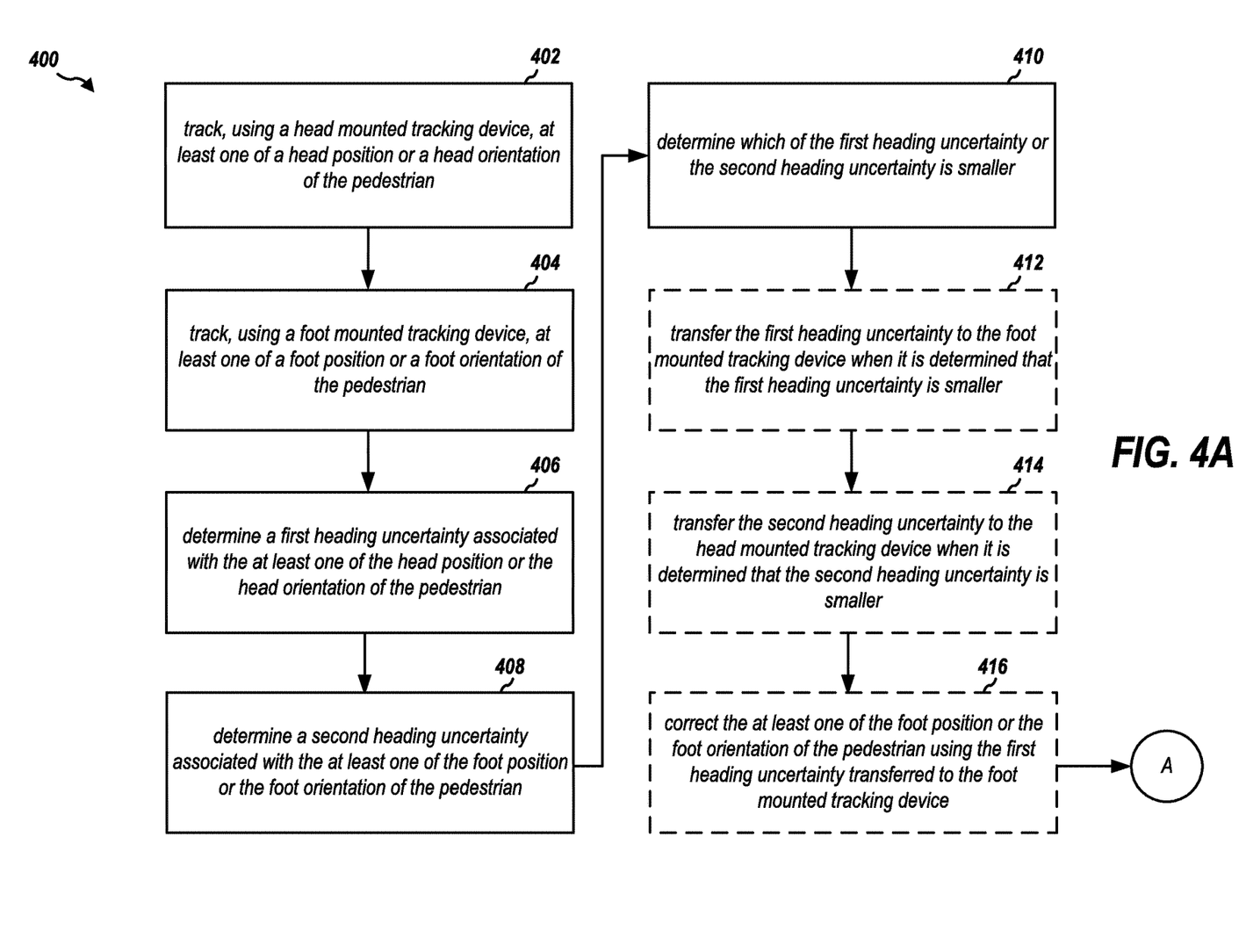
FIGS. 4A and 4B are a flowchart of a method for tracking a position and orientation of a pedestrian in accordance with aspects of the present disclosure.

FIG. 4 is flowchart 400 of a method of tracking a position and orientation of a pedestrian. The method may be performed by a tracking system (e.g., tracking system 100 illustrated in FIG. 1). It should be understood that the operations indicated with dashed lines represent operations for various aspects of the disclosure.

In block 402, the tracking system is able to track, using a head mounted tracking device, at least one of a head position or a head orientation of the pedestrian. For example, referring to FIG. 1, the control unit 110 and image generator may receive tracking data (e.g., from the camera) relating at least one of a head position or a head orientation of the pedestrian. The image generator may generate an image that is displayed on display 104. In an aspect, the camera may include a natural feature tracker (e.g., hybrid optical-based inertial tracker) running a contemporaneous localization and mapping (SLAM) algorithm, such as ORB-SLAM (ORB indicates "Oriented FAST and Rotated BRIEF" features) while searching for known landmarks to provide absolute map registration at the controller.

In block 404, the tracking system is able to track, using a foot mounted tracking device, at least one of a foot position or a foot orientation of the pedestrian. For example, referring to FIG. 1, the tracking system 100 may also include a foot mounted tracking device 114 positioned in a shoe 112 of the pedestrian. The foot mounted tracking device 114 may include a foot mounted inertial measurement unit that tracks the foot position and/or the foot orientation in GPS denied environments to within, e.g., a certain percentage of total distance travelled. For example, the foot mounted tracking device 114 may track the foot position and/or orientation to within 1% of the total distance traveled, which is 1m of error after walking/running 100 m.

In block 406, the tracking system is able to determine a first heading and/or position uncertainty associated with the at least one of the head position or the head orientation of the pedestrian. For example, referring to FIG. 1, the control unit 110 may determine a first heading and/or position uncertainty associated with at least one of the head position or the head orientation of the pedestrian based on the at least one of the head position or the head orientation. For example, the control unit 110 may track the at least one of the head position or the head orientation of the pedestrian by attempting to recognize one or more visual landmarks captured by the camera and may determine the first heading and/or position uncertainty based on the tracking.

In block 408, the tracking system is able to determine a second heading and/or position uncertainty associated with the at least one of the foot position or the foot orientation of the pedestrian. For example, referring to FIG. 1, the foot mounted tracking device 114 may track at least one of a foot position or a foot orientation of the pedestrian. For example, the at least one of the foot position or the foot orientation of the pedestrian may be tracked in a GPS denied environment. In an aspect, the foot mounted tracking device 114 may determine a second heading and/or position uncertainty associated with the at least one of the foot position or the foot orientation of the pedestrian based on the tracking.

At block 410, the tracking system is able to determine which of the first heading uncertainty or the second heading uncertainty is smaller. For example, referring to FIG. 1, the control unit 110 and the foot mounted tracking device 114 may send information associated with their respective heading uncertainties to a communication device 116 carried by the pedestrian. The communication device 116 may determine which of the first heading uncertainty or the second heading and/or position uncertainty is smaller. Alternatively, the control unit 110 and the foot mounted tracking device 114 may send the information associated with their respective heading and/or position uncertainties to each other without the need for communicating with the communication device 116. In this case, a determination with respect to which of the first heading and/or position uncertainty or the second heading and/or position uncertainty is smaller may be made by one or more of the control unit 110 and/or the foot mounted tracking device 114.

In block 412, the tracking device is able to transfer the first heading and/or position uncertainty to the foot mounted tracking device when it is determined that the first heading and/or position uncertainty is smaller. For example, referring to FIG. 1, if the first heading and/or position uncertainty is determined to be smaller than the second heading and/or position uncertainty, the communication device 116 may transmit the information related to the first heading and/or position uncertainty to the foot mounted tracking device 114. Alternatively, when the first heading and/or position uncertainty is smaller than the second heading and/or position uncertainty, the communication device 116 may transmit signaling to the control unit 110 that indicates that information related to the first heading and/or position uncertainty should be sent from the control unit 110 to the foot mounted tracking device 114. Additionally or alternatively, the control unit 110 and the foot mounted tracking device 114 may transmit the information associated with their respective heading and/or position uncertainties to each other without the need for communicating with the communication device 116.

In block 414, the tracking system is able to transfer the second heading and/or position uncertainty to the head mounted tracking device when it is determined that the second heading and/or position uncertainty is smaller. For example, referring to FIG. 1, if the second heading and/or position uncertainty is determined to be smaller, the communication device 116 may transmit information related to the second heading and/or position uncertainty to the control unit 110. Alternatively, when the second heading and/or position uncertainty is smaller than the first heading and/or position uncertainty, the communication device 116 may send signaling to the foot mounted tracking device 114 that indicates that information related to the second heading and/or position uncertainty should be transmitted from the foot mounted tracking device 114 to the control unit 110. Additionally or alternatively, the control unit 110 and the foot mounted tracking device 114 may transmit the information associated with their respective heading and/or position uncertainties to each other without the need for communicating with the communication device 116.

In block 416, the tracking system is able to correct the at least one of the foot position or the foot orientation of the pedestrian using the first heading and/or position uncertainty transferred to the foot mounted tracking device. For example, referring to FIG. 1, the foot mounted tracking device 114 may use the first heading and/or position uncertainty to correct the at least one of the foot position or the foot orientation of the pedestrian rather than by using the second heading and/or position uncertainty when the first heading and/or position uncertainty is determined to be smaller than the second heading and/or position uncertainty.

Figure 4B:
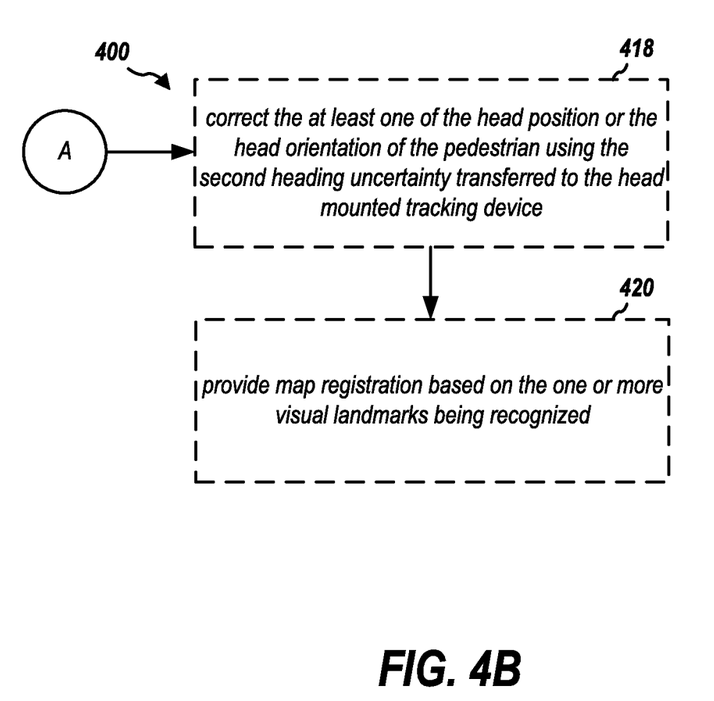

As seen in FIG. 4B, in block 418, the tracking system is able to correct the at least one of the head position or the head orientation of the pedestrian using the second heading and/or position uncertainty transferred to the head mounted tracking device. For example, referring to FIG. 1, the control unit 110 may use the second heading and/or position uncertainty to correct the at least one of the head position or the head orientation rather than by using the first heading and/or position uncertainty when the second heading and/or position uncertainty is determined to be smaller than the first heading and/or position uncertainty.

In block 420, the tracking system is able to provide map registration based on the one or more visual landmarks being recognized. For example, referring to FIG. 1, the control unit 110 may provide map registration based on the one or more visual landmarks being recognized by the camera.

In this way, the tracking system of the present disclosure is able to provide a high rate, low latency head tracking that works robustly in both indoor and outdoor environments without the need for installing any external equipment or markers in the environment. In addition, the tracking system of the present disclosure is able to provide position and orientation tracking of a pedestrian in the absence of GPS data with intermittent visual features and in the presence of magnetic interference.

Figure 5:
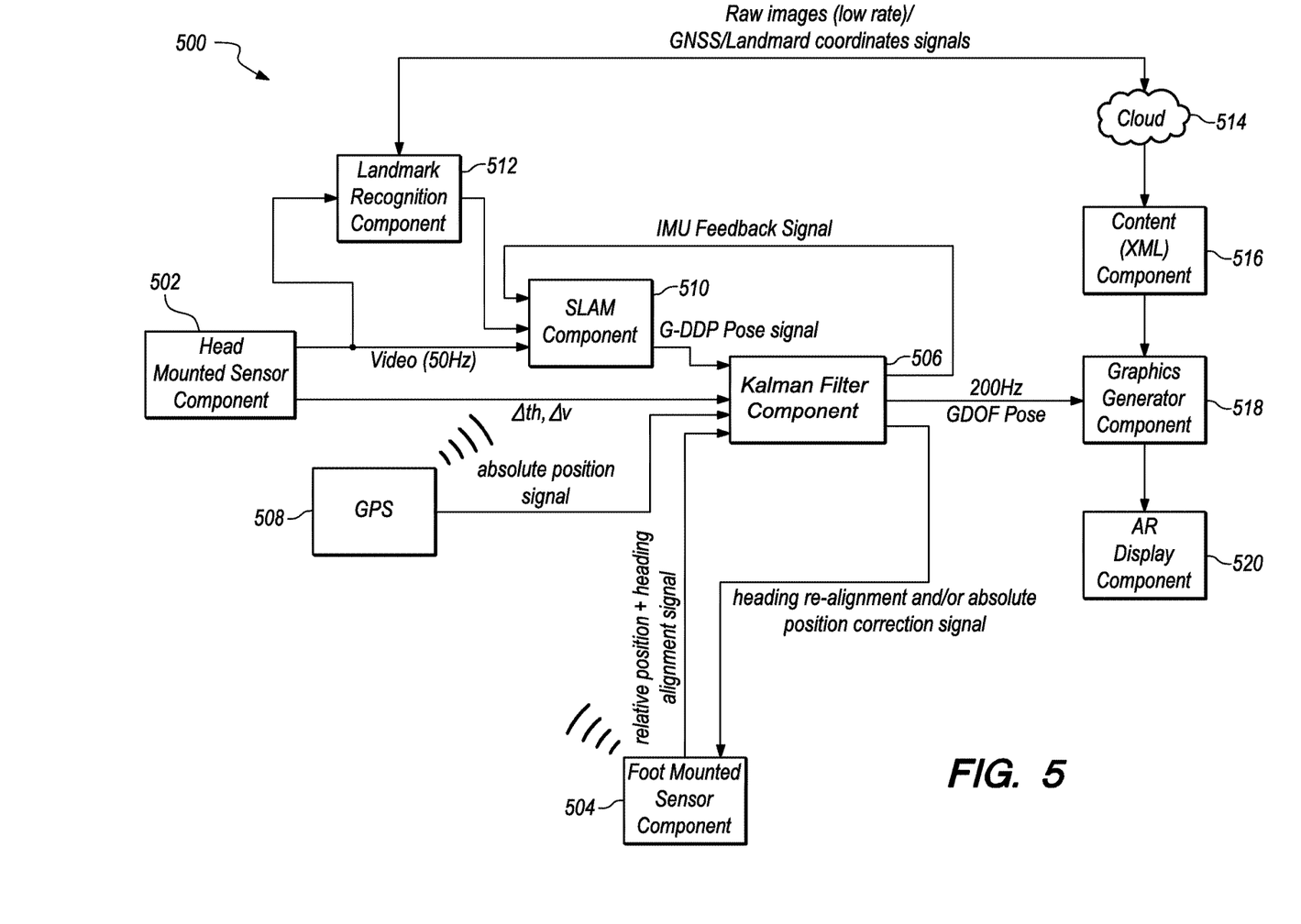
FIG. 5 is a representative flow diagram illustrating data flow between different aspects/components in an example system in accordance with aspects of the present disclosure.

FIG. 5 is a representative data flow diagram 500 illustrating the data flow between different features/components in an example system. The system may be a tracking system, such as tracking system 100 illustrated in FIG. 1. The apparatus includes a head mounted sensor component 502 that tracks at least one of a head position or a head orientation of the pedestrian and searches for known landmarks, a foot mounted sensor component 504 that tracks at least one of a foot position or a foot orientation of the pedestrian, a Kalman Filtering and global pose alignment component 506 that processes each individual optical feature measurement acquired by the HMD 102 separately at a different point in time, using a nonlinear bearings measurement model, which operates as a function of position, as well as orientation, a GPS component 508 that tracks a position of the pedestrian, a SLAM component 510 provides absolute map registration while the head mounted sensor component 502 searches for known landmarks, a landmark recognition component 512 that recognizes known landmarks based on the searches performed by the head mounted sensor component 502, a cloud based network 514 with which the tracking system is in communication, a content component 516 that organizes data obtained by components 502, 504, 506, 508, 510, and 512, such that the signals and data may be used in an predefined or dynamic manner by the tracking system, a graphics generator component 518 that generates an image based on the data received from content component 516, and an AR display component 520 that displays a visual landmark (e.g., building, vehicle, hill, tree, etc.) with a symbol and/or fiducial that is generated by graphics generator component 518.

The apparatus may include additional components that perform each of the functions in the blocks of the algorithm in the aforementioned flowchart of FIGS. 4A and 4B. As such, each block in the aforementioned flowchart of FIGS. 4A and 4B may be performed by a component, and the apparatus may include one or more of those components. The components may include one or more hardware components specifically configured to carry out the stated processes/algorithm, implemented by a processor, for example, configured to perform the stated processes/algorithm, stored within a computer-readable medium for implementation by a processor, or some combination thereof.

Figure 6:
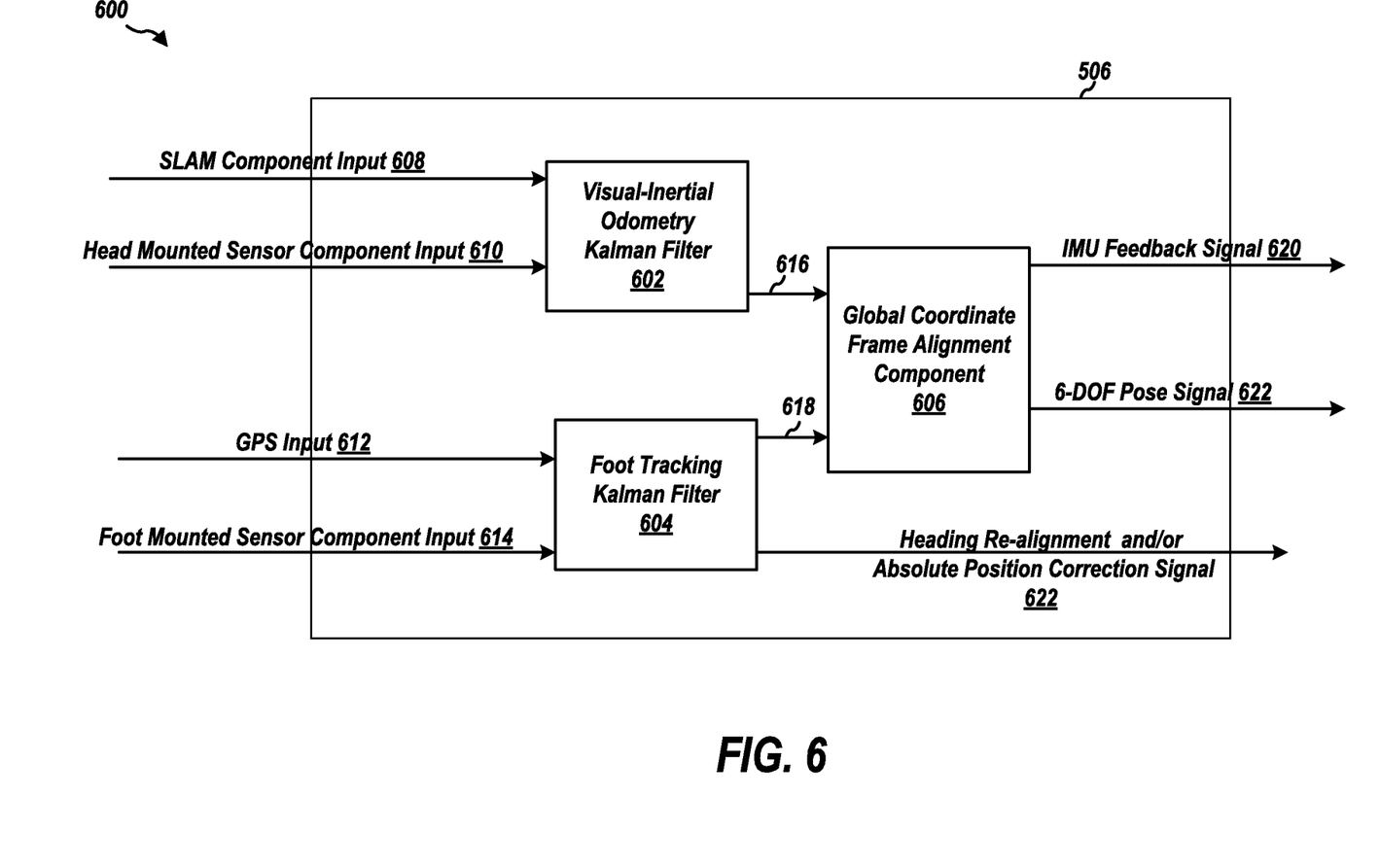
FIG. 6 is a representative flow diagram illustrating data flow between different aspects/components and a Kalman Filter in an example system in accordance with aspects of the present disclosure.

FIG. 6 is a representative flow diagram illustrating data flow between different aspects/components and a Kalman Filtering/Global Pose Alignment Component used in an example system. The system may be a tracking system, such as tracking system 100 illustrated in FIG. 1, and the Kalman Filtering/Global Pose Alignment component 506 may be the Kalman Filtering and Global Pose Alignment Component 506 illustrated in FIG. 5.

For example, the Kalman Filtering and Global Pose Alignment Component 506 may include a VIO Kalman Filter Component 602, a Foot Tracking Kalman Filter Component 604, and a Global Coordinate Frame Alignment Component 606.

In an example embodiment, the VIO Kalman Filter Component 602 may receive a SLAM Component Input 608 and Head Mounted Sensor Component Input 610. In an aspect, the SLAM Component Input 608 may be received from the SLAM Component 510 and the Head Mounted Sensor Component Input 610 may be received from the Head Mounted Sensor Component 502 illustrated in FIG. 5. In an aspect, the VIO Kalman Filter Component 602 may apply a VIO algorithm to one or more of the received SLAM Component Input 608 and/or Head Mounted Sensor Component Input 610 to produce a signal 616 that is sent to the Global Coordinate Frame Alignment Component 606.

In another example embodiment, the Foot Tracking Kalman Filter Component 604 may receive a GPS Input 612 and a Foot Mounted Sensor Component Input 614. In an aspect, the GPS Input 612 may be received from the GPS 508 and the Foot Mounted Sensor Component Input 614 may be received from the Foot Mounted Sensor Component 504 illustrated in FIG. 5. In an aspect, the VIO Kalman Filter Component 602 may apply a VIO algorithm to one or more of the received GPS Input 612 and/or Foot Mounted Sensor Component Input 614 to produce a signal 618 that is sent to the Global Coordinate Frame Alignment Component 606.

Using the received signals 616, 618, the Global Coordinate Frame Alignment Component 606 may reduce and/or correct for heading and/or position uncertainty. An Inertial Measurement Unit (IMU) Feedback Signal 620 that includes a reduction and/or correction in heading and/or position uncertainty may be sent from the Kalman Filtering and Global Pose Alignment component 506 to the SLAM Component 510 illustrated in FIG. 5. In addition, a global degree of freedom (GDOF) signal 622 that also includes a reduction and/or correction in heading and/or position uncertainty may be sent to Graphics Generator Component 518. Additionally and/or alternatively, the Foot Tracking Kalman Filter 604 may send a Heading Re-alignment and/or Absolute Position Correction Signal 622 to the Foot Mounted Sensor Component 504 illustrated in FIG. 5.

Figure 7:
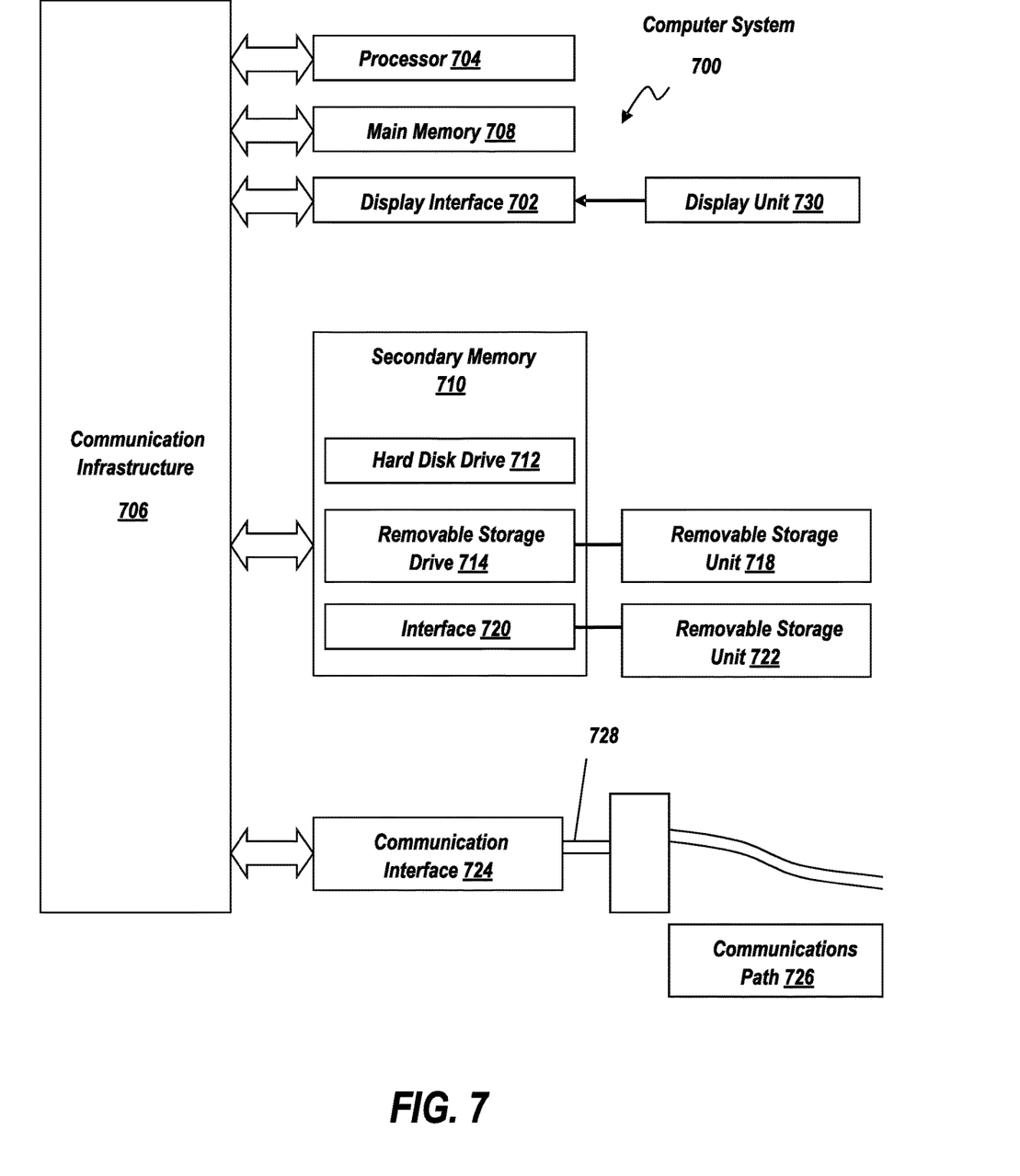
FIG. 7 a system diagram illustrating various example hardware components and other features, for use in accordance with aspects of the present disclosure.

FIG. 7 presents an example system diagram of various hardware components and other features, for use in accordance with aspects presented herein. The aspects may be implemented using hardware, software, or a combination thereof and may be implemented in one or more computer systems or other processing systems. In one example, the aspects may include one or more computer systems capable of carrying out the functionality described herein, e.g., in connection with FIGS. 4A and 4B. An example of such a computer system 700 is shown in FIG. 7.

Computer system 700 includes one or more processors, such as processor 704. The processor 704 is connected to a communication infrastructure 706 (e.g., a communications bus, cross-over bar, or network). Various software aspects are described in terms of this example computer system. After reading this description, it will become apparent to a person skilled in the relevant art(s) how to implement the aspects presented herein using other computer systems and/or architectures.

Computer system 700 can include a display interface 702 that forwards graphics, text, and other data from the communication infrastructure 706 (or from a frame buffer not shown) for display on a display unit 730. Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc., which is read by and written to removable storage drive 714. As will be appreciated, the removable storage unit 718 includes a computer usable storage medium having stored therein computer software and/or data.

In alternative aspects, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728, which may be electronic, electromagnetic, optical or other signals capable of being received by communications interface 724. These signals 728 are provided to communications interface 724 via a communications path (e.g., channel) 726. This path 726 carries signals 728 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 714, a hard disk installed in hard disk drive 712, and signals 728. These computer program products provide software to the computer system 700. Aspects presented herein may include such computer program products.

Computer programs (also referred to as computer control logic) are stored in main memory 708 and/or secondary memory 710. Computer programs may also be received via communications interface 724. Such computer programs, when executed, enable the computer system 700 to perform the features presented herein, as discussed herein. In particular, the computer programs, when executed, enable the processor 710 to perform the features presented herein. Accordingly, such computer programs represent controllers of the computer system 700.

In aspects implemented using software, the software may be stored in a computer program product and loaded into computer system 700 using removable storage drive 714, hard drive 712, or communications interface 720. The control logic (software), when executed by the processor 704, causes the processor 704 to perform the functions as described herein. In another example, aspects may be implemented primarily in hardware using, for example, hardware components, such as application specific integrated circuits (ASICs). Implementation of the hardware state machine so as to perform the functions described herein will be apparent to persons skilled in the relevant art(s).

In yet another example, aspects presented herein may be implemented using a combination of both hardware and software.

Figure 8:
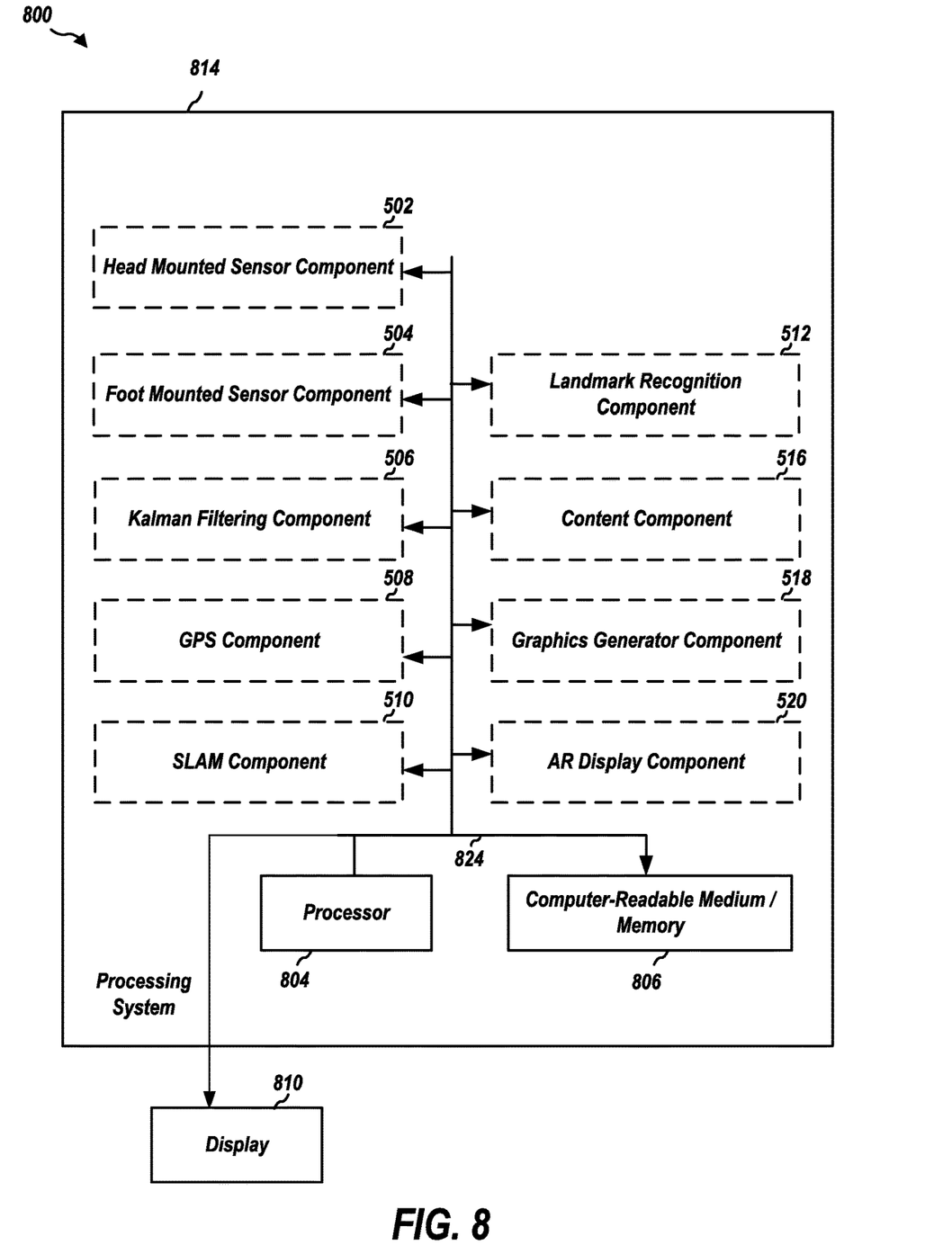
FIG. 8 is a diagram illustrating example aspects of a hardware implementation for a system employing a processing system in accordance with aspects of the present disclosure.

FIG. 8 is a diagram illustrating an example of a hardware implementation for a system 800 employing a processing system 814. The processing system 814 may be implemented with an architecture that links together various circuits including one or more processors and/or components, represented by the processor 804, the components 502, 504, 506, 508, 510, 512, 516, 518, and 520, and the computer-readable medium/memory 806.

The processing system 814 may be coupled to a display 810, such as display 104 in FIG. 1. The processing system may also be coupled to various sensors, such as HMD 102, foot mounted tracking unit 64, camera 214, image generator 216, smart phone 218, etc.

The processing system 814 includes a processor 804 coupled to a computer-readable medium/memory 806 via bus 824. The processor 804 is responsible for general processing, including the execution of software stored on the computer-readable medium/memory 806. The software, when executed by the processor 804, causes the processing system 814 to perform the various functions described supra for any particular apparatus and/or system. The computer-readable medium/memory 806 may also be used for storing data that is manipulated by the processor 804 when executing software. The processing system further includes at least one of the components 502, 504, 506, 508, 510, 512, 516, 518, and 520. The components may be software components running in the processor 804, resident/stored in the computer readable medium/memory 806, one or more hardware components coupled to the processor 804, or some combination thereof. The processing system 814 may be a component of an AR vision-inertial pedestrian tracking system, as illustrated in FIG. 1.

The system 800 may further include features for tracking, using a head mounted tracking device, at least one of a head position or a head orientation of the pedestrian, features for tracking, using a foot mounted tracking device, at least one of a foot position or a foot orientation of the pedestrian, features for determining a first heading and/or position uncertainty associated with the at least one of the head position or the head orientation of the pedestrian, features for determining a second heading and/or position uncertainty associated with the at least one of the foot position or the foot orientation of the pedestrian, features for determining which of the first heading and/or position uncertainty or the second heading and/or position uncertainty is smaller, features for transferring the first heading and/or position uncertainty to the foot mounted tracking device when it is determined that the first heading and/or position uncertainty is smaller, or transferring the second heading and/or position uncertainty to the head mounted tracking device when it is determined that the second heading and/or position uncertainty is smaller, wherein the features for transferring is configured to transfer the first heading and/or position uncertainty to the foot mounted tracking device by automatically transferring the first heading and/or position uncertainty to the foot mounted tracking device when the head mounted tracking device recognizes at least a portion of the foot mounted tracking device, features for correcting the at least one of the foot position or the foot orientation of the pedestrian using the first heading and/or position uncertainty transferred to the foot mounted tracking device, wherein the features for transferring is configured to transfer the second heading and/or position uncertainty to the head mounted tracking device by automatically transferring the second heading and/or position uncertainty to the head mounted tracking device when the head mounted tracking device recognizes at least a portion of the foot mounted tracking device, features for correcting the at least one of the head position or the head orientation of the pedestrian using the second heading and/or position uncertainty transferred to the head mounted tracking device, wherein the features for tracking is configured to track the at least one of the head position or the head orientation of the pedestrian by attempting to recognize one or more visual landmarks, features for providing map registration based on the one or more visual landmarks being recognized, wherein the features for tracking are configured to track the at least one of the foot position or the foot orientation of the pedestrian in a GPS denied environment, wherein the first heading and/or position uncertainty is related first yaw information associated with the at least one of the head position or the head orientation of the pedestrian, and wherein the second heading and/or position uncertainty is related to second yaw information associated with the at least one of the foot position or the foot orientation of the pedestrian. The aforementioned features may be carried out via one or more of the aforementioned components of the system 800 and/or the processing system 814 of the system 800 configured to perform the functions recited by the aforementioned features.

Thus, aspects may include a system for tracking a position and orientation of a pedestrian, e.g., in connection with FIGS. 4A and 4B.

The system may include additional components that perform each of the functions blocks of the algorithm in the aforementioned flowcharts of FIGS. 4A and 4B. As such, each block in the aforementioned flowcharts of FIGS. 4A and 4B may be performed by a component and the system may include one or more of those components. The components may include one or more hardware components specifically configured to carry out the stated processes/algorithm, implemented by a processor configured to perform the stated processes/algorithm, stored within a computer-readable medium for implementation by a processor, or some combination thereof Thus, aspects may include a non-transitory computer-readable medium for tracking a position and orientation of a pedestrian, the non-transitory computer-readable medium having control logic stored therein for causing a computer to perform the aspects described in connection with, e.g., FIGS. 4A and 4B.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method for tracking a position and orientation of a pedestrian, the method comprising:
   tracking, using a head mounted tracking device, at least one of a head position or a head orientation of the pedestrian;
   tracking, using a foot mounted tracking device, at least one of a foot position or a foot orientation of the pedestrian:
   determining a first heading or a first position uncertainty associated with the at least one of the head position or the head orientation of the pedestrian;
   determining a second heading or a second position uncertainty associated with the at least one of the foot position or the foot orientation of the pedestrian;
   determining, using at least one of a communication device, the head mounted tracking device or the foot mounted tracking device, which of the first heading or the first position uncertainty or the second heading or the second position uncertainty is smaller; and
   transferring, via the at least one of the communication device, the head mounted tracking device or the foot mounted tracking device, the first heading or the first position uncertainty to the foot mounted tracking device to correct the foot position or the foot orientation of the pedestrian when it is determined that the first heading or the first position uncertainty is smaller, or transferring, via the at least one of the communication device, the head mounted tracking device or the foot mounted tracking device, the second heading or the second position uncertainty to the head mounted tracking device to correct the head position or the head orientation of the pedestrian when it is determined that the second heading or the second position uncertainty is smaller.

2. The method of claim 1, further comprising: when the head mounted tracking device recognizes at least a portion of a shoe with includes the foot mounted tracking device automatically transferring the first heading or the first position uncertainty to the foot mounted tracking device.

3. The method of claim 1, further comprising: correcting the at least one of the foot position or the foot orientation of the pedestrian using the first heading or the first position uncertainty transferred to the foot mounted tracking device.

4. The method of claim 1, further comprising: when the mounted tracking device recognizes at least a portion of a shoe with includes the foot mounted tracking device automatically transferring the second heading or the second position uncertainty to the head mounted tracking device.

5. The method of claim 1, further comprising: correcting the at least one of the head position or the head orientation of the pedestrian using the second heading or the second position uncertainty transferred to the head mounted tracking device.

6. The method of claim 1, wherein the tracking the at least one of the head position or the head orientation of the pedestrian includes performing a recognition operation for one or more visual landmarks.

7. The method of claim 6, further comprising:
   providing map registration based on the one or more visual landmarks being recognized.

8. The method of claim 1, wherein the at least one of the foot position or the foot orientation of the pedestrian is tracked in a global positioning system (GPS) denied environment.

9. The method of claim 1, wherein the first heading or the first position uncertainty is related first yaw information associated with the at least one of the head position or the head orientation of the pedestrian.

10. The method of claim 1, wherein the second heading or the second position uncertainty is related to second yaw information associated with the at least one of the foot position or the foot orientation of the pedestrian.

11. The method of claim 1, wherein the at least one of the head position or the head orientation of the pedestrian is tracked by obtaining images using a monochrome camera in visible light or a digital night vision image sensor.

12. The method of claim 11, further comprising:
applying visual-inertial odometry to the images obtained by the monochrome camera using a kalman filter.

13. A system for tracking a position and orientation of a pedestrian, the system comprising:
a memory; and at least one processor coupled to the memory and configured to;
track, using a head mounted tracking device, at least one of a head position or a head orientation of the pedestrian;
track, using a foot mounted tracking device, at least one of a foot position or a foot orientation of the pedestrian;
determine a first heading or a first position uncertainty associated with the at least one of the head position or the head orientation of the pedestrian;
determine a second heading or a second position uncertainty associated with the at least one of the foot position or the foot orientation of the pedestrian;
determine, using at least one of a communication device, the head mounted tracking device or the foot mounted tracking device, which of the first heading or the first position uncertainty or the second heading or the second position uncertainty is smaller; and
transfer, via the at least one of the communication device, the head mounted tracking device or the foot mounted tracking device, the first heading or the first position uncertainty to the foot mounted tracking device to correct the foot position or the foot orientation of the pedestrian when it is determined that the first heading or the first position uncertainty is smaller, or transferring, via the at least one of the communication device, the head mounted tracking device or the foot mounted tracking device, the second heading or the second position uncertainty to the head mounted tracking device to correct the head position or the head orientation of the pedestrian when it is determined that the second heading or the second position uncertainty is smaller.

14. The system of claim 13, further comprising: when the head mounted tracking device recognizes at least a portion of a shoe with includes the foot mounted tracking device automatically transferring the first heading or the first position uncertainty to the foot mounted tracking device.

15. The system of claim 13, wherein the at least one processor is further configured to correct the at least one of the foot position or the foot orientation of the pedestrian using the first heading or the first position uncertainty transferred to the toot mounted tracking device.

16. The system of claim 13, further comprising: when the head mounted tracking device recognizes at least a portion of a shoe with includes the foot mounted tracking device automatically transferring the second heading or the second position uncertainty to the head mounted tracking device.

17. The system of claim 13, wherein the at least one processor is further configured to correct the at least one of the head position or the head orientation of the pedestrian using the second heading or the second position uncertainty transferred to the head mounted tracking device.

18. The system of claim 13, wherein the at least one processor is configured to track the at least one of the head position or the head orientation of the pedestrian by attempting to recognize one or more visual landmarks.

19. The system of claim 18, wherein the at least one processor is further configured to provide map registration based on the one or more visual landmarks being recognized.

20. The system of claim 13, wherein the at least one processor is configured to track the at least one of the foot position or the foot orientation of the pedestrian in a global positioning system (GPS) denied environment.

21. The system of claim 13, wherein the first heading or the first position uncertainty is related first yaw information associated with the at least one of the head position or the head orientation of the pedestrian, and wherein the second heading or the second position uncertainty is related to second yaw information associated with the at least one of the foot position or the foot orientation of the pedestrian.

22. A non-transitory computer-readable medium storing computer executable code for wireless communication, comprising code for:
tracking, using a head mounted tracking device, at least one of a head position or a head orientation of a pedestrian;
tracking, using a foot mounted tracking device, at least one of a foot position or a foot orientation of the pedestrian;
determining a first heading or a first position uncertainty associated with the at least one of the head position or the head orientation of the pedestrian;
determining a second heading or a second position uncertainty associated with the at least one of the foot position or the foot orientation of the pedestrian;
determining, using at least one of a communication device, the head mounted tracking device or the foot mounted tracking device, which of the first heading or the first position uncertainty or the second heading or the second position uncertainty is smaller; and
transferring, via the at least one of the communication device, the head mounted tracking device or the foot mounted tracking device, the first heading or the first position uncertainty to the foot mounted tracking device to correct the foot position or the foot orientation of the pedestrian when it is determined that the first heading or the first position uncertainty is smaller, or transferring, via the at least one of the communication device, the head mounted tracking device or the foot mounted tracking device, the second heading or the second position uncertainty to the head mounted tracking device to correct the head position or the head orientation of the pedestrian when it is determined that the second heading or the second position uncertainty is smaller.

* * * * *